W. P. McCREA.
SPRING SEAT ATTACHMENT.
APPLICATION FILED JUNE 1, 1915.
1,174,429.
Patented Mar. 7, 1916.
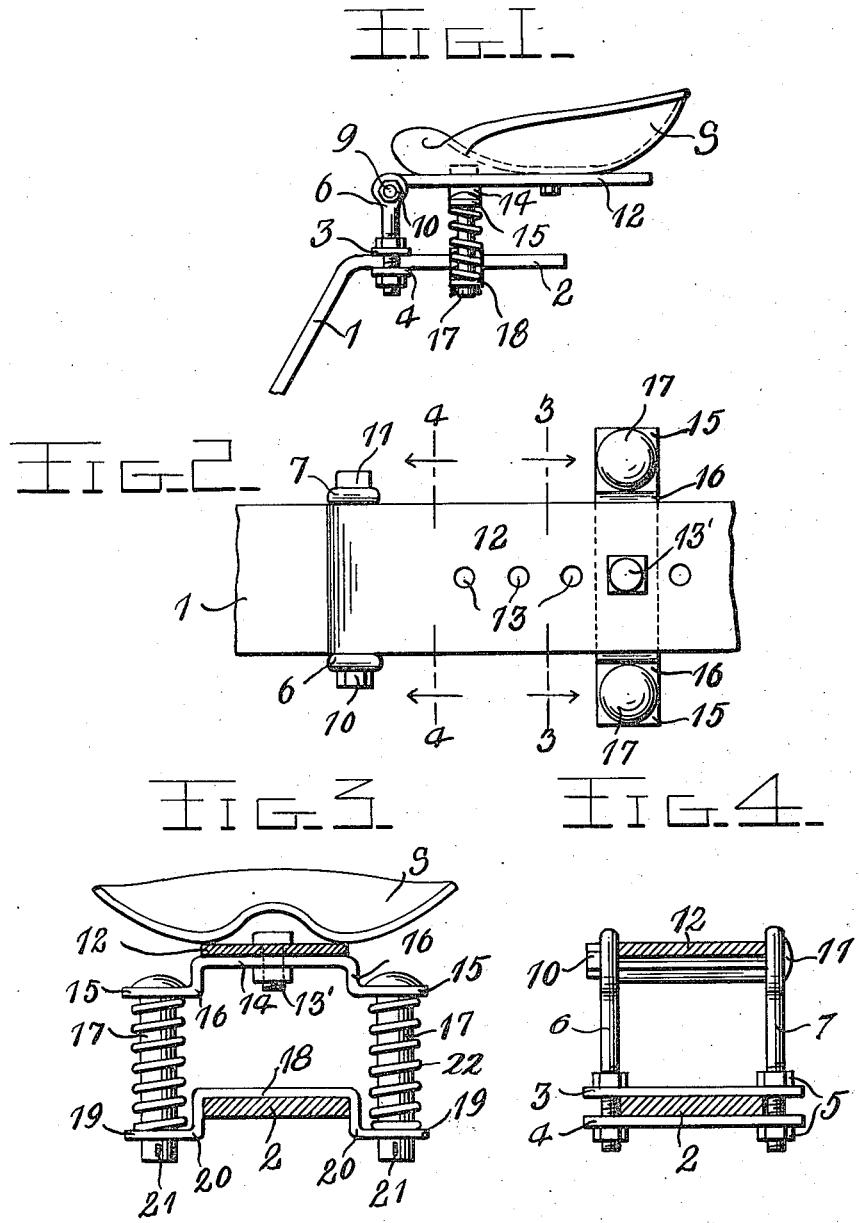
Witnesses
J. Ralph Hogs
Inventor
W. P. McCrea
By H. B. Wilson & Co.
Attorney

UNITED STATES PATENT OFFICE.

WALTER P. McCREA, OF LOGANSPORT, INDIANA.

SPRING-SEAT ATTACHMENT.

1,174,429.     Specification of Letters Patent.     Patented Mar. 7, 1916.

Application filed June 1, 1915. Serial No. 31,604.

*To all whom it may concern:*

Be it known that I, WALTER P. McCREA, a citizen of the United States, residing at Logansport, in the county of Cass and State of Indiana, have invented certain new and useful Improvements in Spring-Seat Attachments; and I do declare the following to be a full, clear, and exact description of the invention, such as will enable others skilled in the art to which it appertains to make and use the same.

This invention relates to spring seats and more particularly to those designed for use on farm and other machinery.

The main object of the invention is to provide an attachment for spring seats of this character which may be interposed between the seat post and the seat and which is so constructed as to reduce to a minimum the vibrations and shocks imparted to the seat thereby rendering the driver more comfortable.

Another object of the invention is to provide an attachment for spring seats of this character so constructed as to form a unit which rests upon but is not attached to the vehicle seat post but is attached to the seat bar and is adjustable relatively to both.

With these and other objects in view, the invention consists of certain novel features of construction and the combination and arrangement of parts as will be more fully described and claimed.

In the accompanying drawings: Figure 1 represents a side elevation of a seat post and seat equipped with this improvement; Fig. 2 is a plan view thereof with the seat removed. Fig. 3 is a transverse section taken on the line 3—3 of Fig. 2; and, Fig. 4 is a similar view taken on the line 4—4 of Fig. 2.

In the embodiment illustrated a seat post 1 of a flat single leaf type is shown such as is ordinarily used for supporting drivers' seats on farm machinery and the like and which is provided with the usual rearward lateral extension 2 on which the seat S is mounted. A pair of straps 3 and 4 extend transversely to the post extension 2 at the front end thereof and are clamped to said extension by jam nuts 5 which are mounted on eye bolts 6 and 7 extending through the ends of said straps on opposite sides of the extension 2 as is shown clearly in Fig. 4. These eye bolts extend upwardly on opposite side edges of said extension and receive in the eyes thereof a transversely arranged bolt 9 secured in said eyes by a suitable nut 10 on one end and the usual head 11 on the other. Pivotally mounted on this bolt 9 between the eye bolts 6 and 7 is a seat bar 12 which is of a width substantially equal to the distance between the eye bolts and has one end thereof formed into a bearing for receiving the bolt 9 whereby said bar is hingedly connected to said bolt and supported in a plane above the extension 2 and substantially parallel therewith. This seat bar 12 is provided with a plurality of alined longitudinally spaced apertures 13 which are designed to receive a bolt 13' which passes through the seat S and through a strap 14 which extends transversely across the bar 12 and projects on opposite sides thereof having its ends 15 offset downwardly as shown at 16. These ends 15 are apertured to receive bolts 17 which depend from said ends and extend through similar ends of a strap 18 which rests on and spans the post extension 2 projecting beyond opposite edges thereof and having its ends 19 offset as shown at 20 and apertured to receive the bolts 17. These bolts 17 are shown provided in their lower ends with apertures 21 for receiving cotter pins for securing them in operative position but it is of course understood that other fastening means may be employed if found desirable. Coiled springs 22 are arranged on the bolts 17 between the ends of the upper and lower straps 14 and 18 and which are designed to form cushioning elements for the seat to take up vibrations and shocks imparted thereto through the machinery on which the seat is mounted.

From the above description it will be obvious that the saddle straps 14 and 18, the bolts 17 and springs 22 when combined as above set forth form a unitary structure which rests upon but is not attached to the seat post extension 2 and is attached to the seat bar 12 by the bolt 13' and which is adjustable by means of said bolt and the perforations 13 to suit the operator.

The seat may be adjusted either by moving the seat S longitudinally on the bar 12; by moving the spring saddles 14 and 18 longitudinally on said bar; or by loosening the nuts 5 and moving the eye bolts longitudinally on the extension 2 thus insuring an accurate adjustment of said seat at any desired point to suit the wishes of the user.

A seat mounted as above described will be very comfortable in use in that the cushioning springs will take up and absorb all shocks and jars thus forming additional cushioning means for the seat, the ordinary cushioning means being provided by the spring post 1.

In addition to the above pointed out advantages, it will be obvious that owing to the peculiar construction of this seat and its hinged connection with the posts 6 and 7, that it may be swung forwardly into reverse position when the machine to which it is attached is not in use, thereby gaining considerable space at the rear of the seat which is especially desirable in storing farm machinery, and when the machine to which it is attached stands out and is unprotected, the seat may be swung forward to prevent it from getting wet should a storm come up.

I claim as my invention:

The combination with a seat post having a lateral extension, of a pair of straps arranged transversely of said extension in superposed relation on opposite sides thereof, eye bolts extending through said straps beyond opposite sides of said extension with the eyes thereof positioned in a plane above said extension, a transversely arranged bolt mounted in said eyes, a seat bar pivotally mounted on said transverse bolt and provided with a plurality of longitudinally spaced apertures, a transversely disposed strap extending under said seat bar at a point spaced from its pivoted end, a bolt extending through said strap and one of the apertures in said seat bar for adjustably connecting said strap to said seat bar, a similar strap supported on said post extension in vertical alinement with said seat bar supporting strap, bolts connecting the ends of said vertically alined straps, cushioning springs mounted on said last mentioned bolts between said vertically alined straps, and a seat mounted on said seat bar.

In testimony whereof I have hereunto set my hand in presence of two subscribing witnesses.

WALTER P. McCREA.

Witnesses:
CHARLES E. YARLOTT,
PAUL M. SOUDER.